INVENTOR.
TRAVER J. SMITH
BY Allen and Chromy
ATTORNEYS

May 5, 1970 — T. J. SMITH — 3,509,988
SHUFFLE FEED MECHANISM
Filed June 13, 1968 — 3 Sheets-Sheet 2
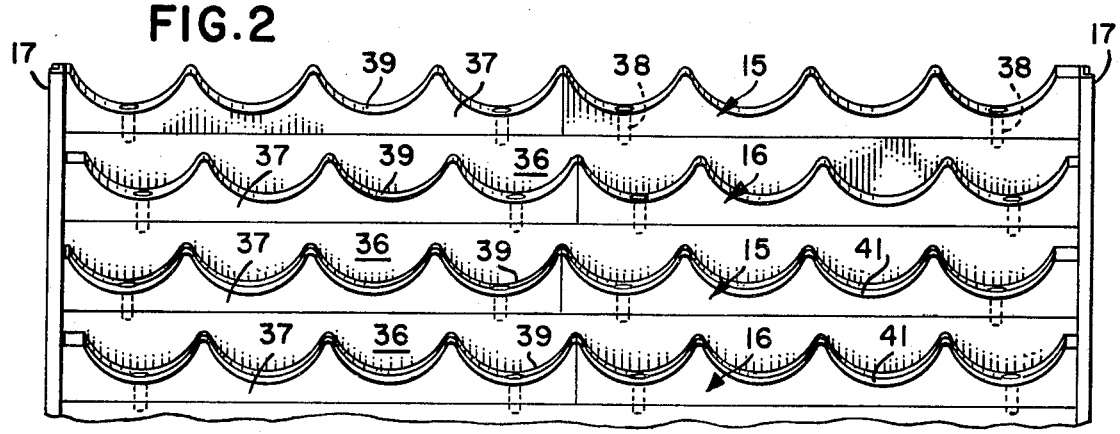
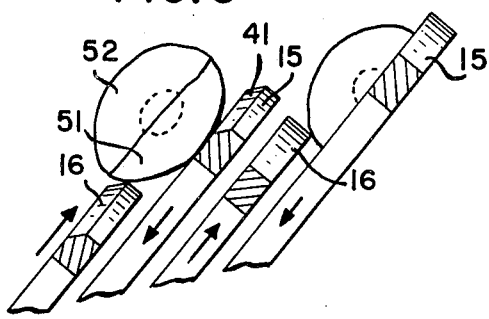
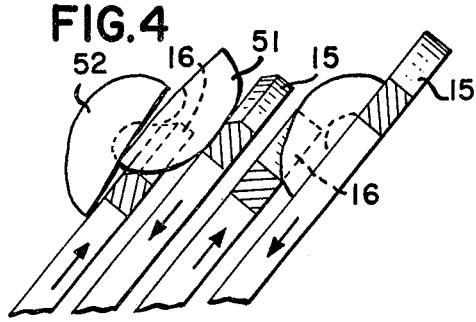
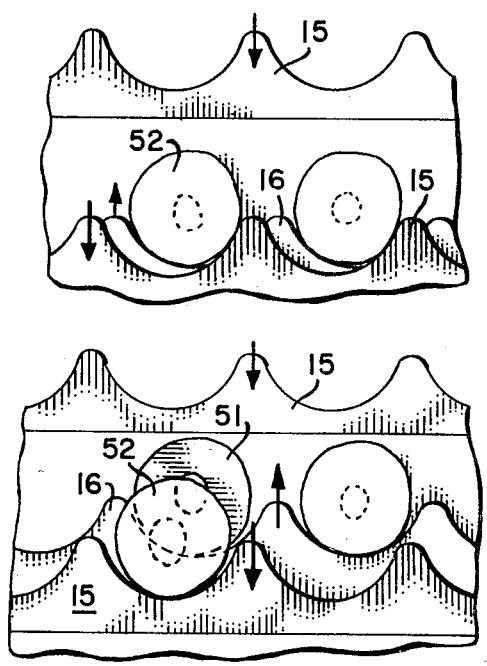
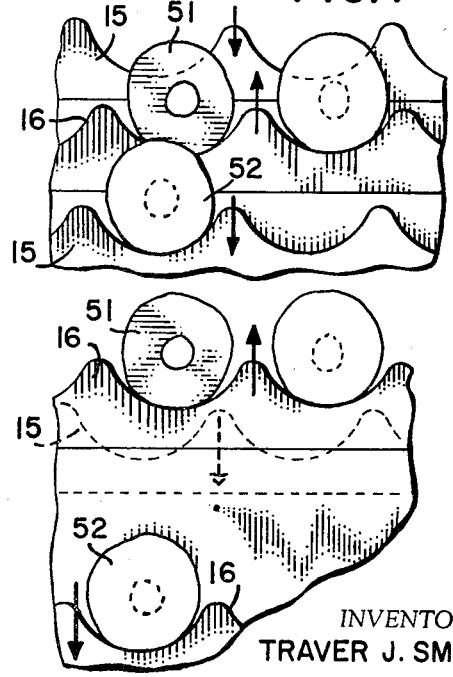
INVENTOR.
TRAVER J. SMITH
BY Allen and [Attorneys signature]
ATTORNEYS May 5, 1970 T. J. SMITH 3,509,988
SHUFFLE FEED MECHANISM Filed June 13, 1968 3 Sheets-Sheet 3

INVENTOR.
TRAVER J. SMITH
BY *Allen and Chromy*
ATTORNEYS

United States Patent Office 3,509,988
Patented May 5, 1970

3,509,988
SHUFFLE FEED MECHANISM
Traver J. Smith, San Jose, Calif., assignor of one-half to Genevieve I. Hanscom and one-half to Genevieve I. Hanscom, Robert Magnuson, and Lois J. Thomson (formerly Lois J. Duggan), as trustees of the estate of Roy M. Magnuson
Filed June 13, 1968, Ser. No. 736,794
Int. Cl. B65g 27/04
U.S. Cl. 198—219                    5 Claims

ABSTRACT OF THE DISCLOSURE

A shuffle feed structure for feeding articles such as peach halves in parallel single files and for breaking up peach halves which have gotten cupped together similar to whole peaches. The shuffle feed members have a series of similar scalloped or curved recesses or pockets in the fruit advancing faces thereof and alternate shuffle feed members have these pockets offset laterally of the machine to produce the separating action. Certain shuffle members have their fruit engaging corners cutaway as by beveling to perform the separating action.

Description of invention

In the handling of peach halves containing pits which commonly are found from peaches having split pits, the feeding from bulk into individual files of peach halves for feeding to a peach half pitting structure presents problems due to the fact that in the bulk handling of the halves certain of the halves will come together as a "whole" peach with their cut faces adjacent so that they start through the feeding operation and they must be separated as they are fed in order to obtain a reliable feed of peach halves and to maintain all lines full.

The present invention is concerned with the feeding of these peach halves as a plurality of parallel files in a shuffle feed structure and to effect the separation of the peach halves which come cupped faces together as a "whole" peach. The flights of the shuffle feed are provided with arcuate similar recesses for the feeding of the peach valves, and these adjacent parallel rows of the pockets or recesses are offset a fraction of the entire width of the recess so as to provide a breaking up action on the peach halves which have come together as a "whole" peach, whatever the position of the "whole" peach.

Also, the corner edges of the flights, i.e., where the front advancing face meets the top supporting surface are cut away or beveled to also perform a separating action on the peaches which are formed as "whole" peaches with two halves clinging together.

It is a general object of the invention, therefor to provide a shuffle feed mechanism which performs the feeding of a plurality of parallel single files for feeding to a plurality of peach pitting machines.

A further object of the invention is to provide a shuffle feed structure wherein the construction of the shuffles is such as to promote the separation of peach halves which are clinging together to form substantially a "whole" peach.

Another object of the invention is to provide a shuffle feed single filing structure wherein articles which cling together are separated due to an inherent zigzag feeding action of the shuffle flights.

Other objects and advantages of the invention will be apparent from the following description of a preferred embodiment of the invention, as illustrated in the accompanying drawings, in which:

FIG. 2 is a fragmentary plan view taken as indicated by the line 2—2 in FIG. 1 of four adjacent flights of the shuffle feed structure;

FIG. 3 is a diagrammatic sectional view illustrating the operation of the shuffle feed structure on two peach halves which have come cupped face together so as to form a "whole" peach where the plane of separation of these two peach halves is substantially parallel to the plane of travel of the flights;

FIG. 4 is another operational view similar to FIG. 3 but showing a different phase in the operation of the separation of the peach halves;

FIG. 5 is a fragmentary plan view illustrating the operation being similar in its positioning of the peach halves to that shown in FIG. 3;

FIGS. 6, 7 and 8 are views similar to FIG. 5 showing the peach halves in sequential positions following those shown in FIG. 5;

Figure 1:
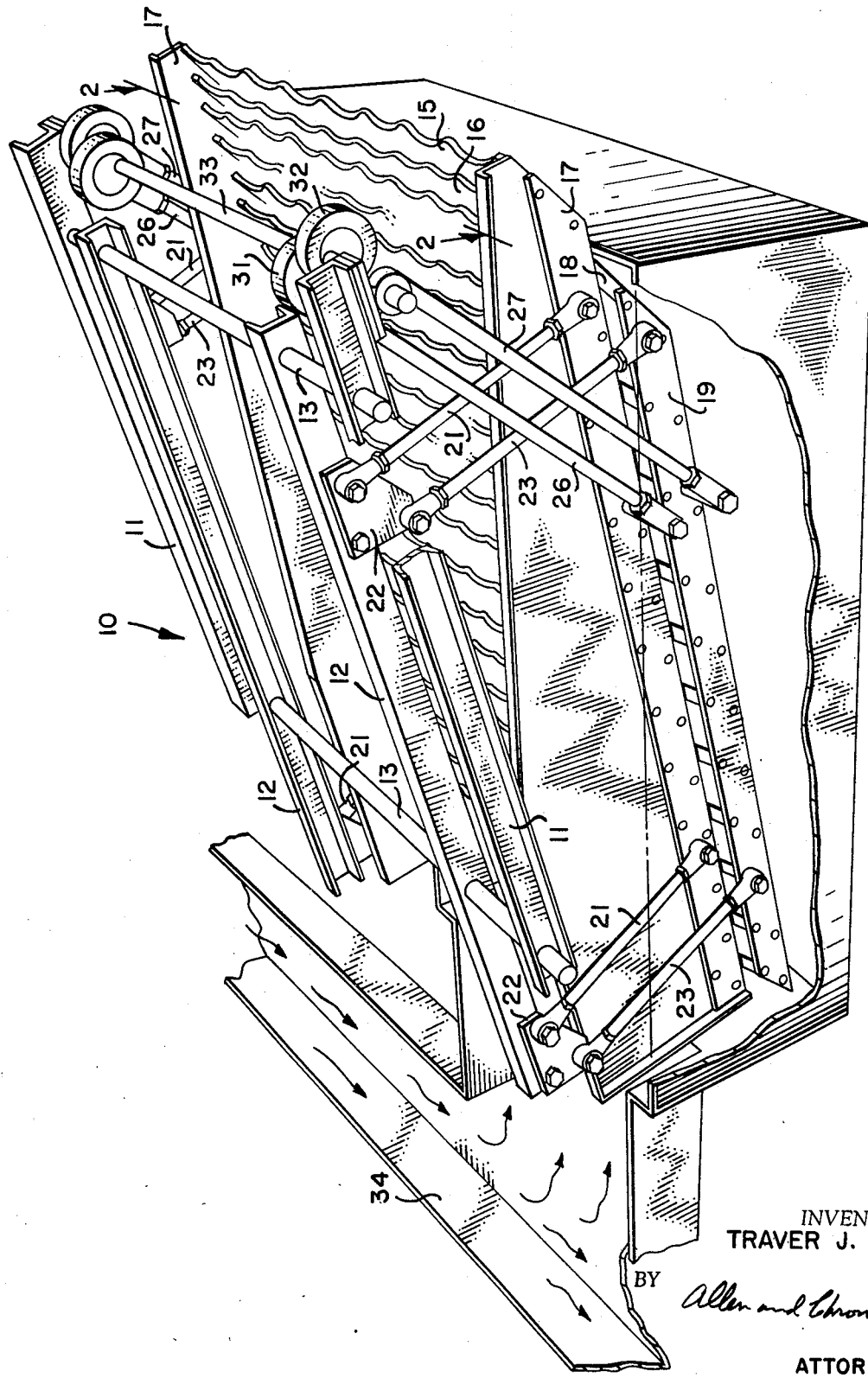
FIG. 1 is a perspective view of a shuffle feed structure embodying the instant invention.
Figure 9:
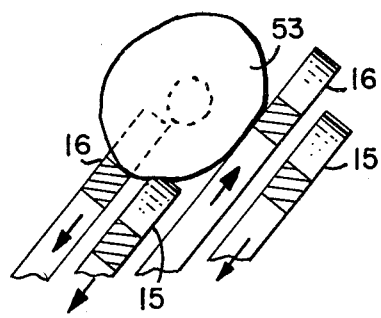
FIG. 9 is a fragmentary sectional view showing the operation of the sorting structure as applied to peach halves where the cupped faces are together in a substantially vertical plane.
Figure 10:
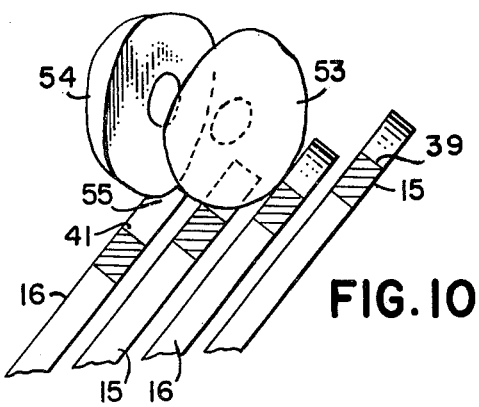
FIG. 10 is a fragmentary plan view showing the peach halves similar to the showing in FIG. 9.
Figure 11:
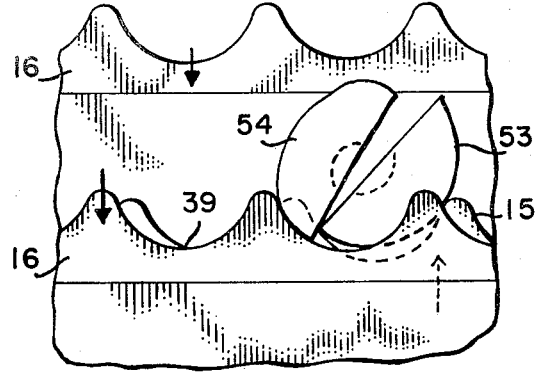
FIGS. 11, 12, 13 and 14 are views similar to FIG. 10 showing the peach halves in sequential positions following those of FIG. 10.

Referring to FIG. 1, the shuffle feed structure includes an overhead frame 10 which may be supported in suitable manner by suspension from above, and this frame comprises respective outer frame members 11, and respective inner frame members 12 which are all suitable mounted in an inclined position. Two cross shafts 13 serve to connect these frame members 11 and 12.

The shuffle feeding mechanism comprises two similar movable sets of shuffle members 15 and 16 which are mounted in inclined position and have a long upwardly facing article supporting portion and a short upwardly facing article feeding and supporting portion. The set of shuffle feed members 15 extend between and are secured to opposite frame members 17, and the set of shuffle members 16 are secured on upwardly projecting angles or members 18 from opposite frame members 19, only one of which is seen in FIG. 1. The frame members 17 are supported by four upwardly extending pivoted links 21 which are secured to a plate 22 on the inner frame members 12 and the frame members 19 and their corersponding shuffle members 16 are supported by respective parallel links 23 which are similarly connected in a pivoted fashion to the plates 22. It will be understood that in the usual fashion the shuffle members 15 and 16 of the respective sets of shuffle members are disposed alternately in the series of shuffle members shown and as one set of shuffle members advances in feeding movement, the other shuffle member is being retracted.

The reciprocating drive or the respective shuffle feed members is obtained by drive links 26 and 27, there being one pair on each side, the drive links 26 being connected to respective frames 17 and 19 at their lower ends and at the upper end to respective eccentric straps 31 and 32 on a shaft 33 which is suitably driven from a motor, not shown. The articles, such as peach halves, to be fed to the shuffle feed members are conveyed thereto by a water system including a flume 34 of conventional construction.

This type of shuffle feed mechanism is disclosed in the patent to Magnuson No. 2,792,929, issued May 21, 1957. It will be understood, however, that the invention is equally applicable to a shuffle feed in which one set of shuffle feed members is stationary and the other set reciprocates with respect thereto.

Referring to FIG. 2 it will be seen that each shuffle member comprises a base part 36 and a pocket part 37. The pocket part provides the advancing face of the shuffle member and is secured to the base part 36 by screws 38. As shown, two similar pocket parts 37 are used to provide each transverse series of pockets 39. This structure enables easy replacement of the active parts of the shuffle members or flights, whether for reasons of changes of article or size in the article being handled or whether because of wear or accidental breakage.

It will be seen that each face of each of the members 15 and 16 (FIG. 2) is provided with a plurality of similar arcuate recesses or pockets 39 forming a transverse row in each shuffle member. The pockets 39 on the members 15 are offset laterally from the similar pockets on adjacent members 16, this being preferably a minor fraction of the width of a pocket. As shown, the pockets 39 are offset as described.

Also, certain of the shuffle members have their corner faces where the article advancing face meets the article supporting face cutaway as at 41, and this cutaway construction may be either a bevel surface or a recessed surface so that the effective feeding action of the upper portion of the shuffle member is delayed by the depth of the bevel. Also, in effect, a camming surface is provided to enhance a non-feeding action of a pocket with respect to the uppermost half peach in a pocket.

Referring in particular to FIGS. 3 and 4, the operation of the offset and beveled flights is illustrated with respect to a "double" where two peach halves are positioned cupped face together and where the plane of separation is substantially horizontal. It will be seen that the first advancing force of the flight 16 is on the lower peach half 51, and the upper peach half 52 will not receive an advancing force. The upper peach half 52 is subjected to the cam action of the bevel 41 so as to slide or progress rearwardly over this flight as shown in FIG. 4. This same differential feeding action will occur in most instances with unbeveled flights as seen in FIGS. 5, 6, 7 and 8.

Referring again to FIGS. 2, 7 and 8 it will be apparent that a "whole" peach comprised of two halves which have come cupped face together receives its advancing action differently as it falls from one shuffle member onto another and the off-center falling of a "whole" peach (comprising two peach halves cupped face together) produces a jarring of the peach to promote breaking apart of the fruit as it is deposited from one shuffle feed member onto another. Also, the advancing face of each adjacent shuffle member as shown is in a slightly different position with respect to the two peach halves, as shown in FIGS. 7, 8, etc., so as to provide a differential progressing action in these two peach halves including a lateral component, and thereby tend to break up a "double" in any relative position of the two halves.

Figure 13:
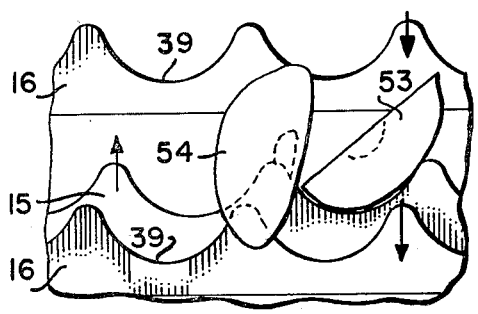
Figure 12:
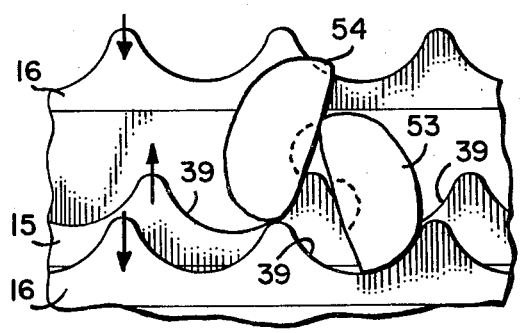
Figure 14:
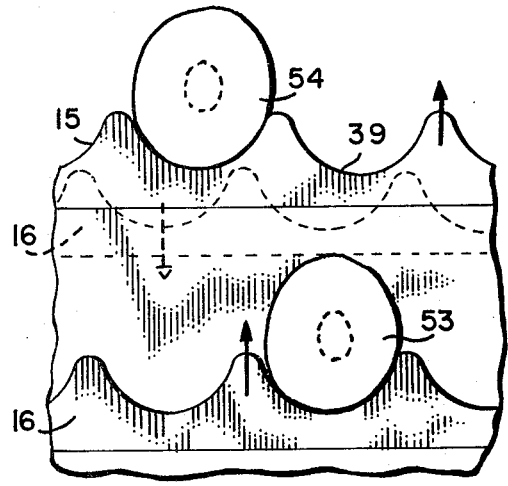

Referring to FIGS. 9 through 14, the sequence of views illustrates the breaking up of a "double" where the two peach halves are clinging together with the plane of separation vertical or substantially vertical. From the position shown in FIGS. 9 and 10, the "whole" peach being pushed by a shuffle 16 over and off of a shuffle 15 will have one of its halves strike an inclined surface of the shuffle 15 due to the offsetting of the pockets and thereby be given a lateral component of movement to the peach as a whole. Also, it will be noted that the peach half 53 on the right will be free to fall because of the offset contour of the pocket 39 in the adjacent shuffle member 15 and to be advanced thereby. The peach half 54 is hindered from toppling forward by the nose or projection 55 which it encounters, and sometimes by the peach half in an adjacent pocket. As this intermediate flight 15 of the shuffle feed continues to progress upward, the peach half 54 will topple backward over its beveled edge 41, as shown in FIG. 13, and, hopefully, will encounter an empty scallop or pocket of the next lower flight or flights. If the "whole" peach is not broken up into two halves by the advance from the first dropping, the same action is applied during the next feeding step but in reverse direction, as illustrated for example, in FIGS. 12 and 13. Thus, in traveling along the shuffle feed, the halves of a "whole" peach are subjected to differential dropping actions and differential support actions which tend to break the clinging force between the two halves and to break them up into separate halves, and also to advance one peach half ahead of the other.

The description of the operation has been made with respect to two extreme positions of two peach halves cupped face together to form a "whole" peach. It will be understood, however, that peach halves will be progressed as a "whole" peach in any of a plurality of angularly disposed positions of the plane of separation of the two peach halves, and that the separating action in many of these cases will be a combined action of the differential feeding effects on the peach halves of both the offset pockets and of the beveled or cut-away corner surface of certain of the pockets.

While I have shown and described certain preferred embodiments of the invention, it will be understood that the invention is capable of variation and modification from the forms shown so that the scope thereof should be limited only by the proper scope of the claims appended hereto.

What I claim is:

1. A shuffle feed sorting structures comprising a frame, a first set of transversely disposed shuffle members carried by said frame, a second set of transversely disposed shuffle members carried by said frame and interposed between the shuffle members of said first set in alternating relation therewith, means mounting at least one set of said shuffle members for reciprocation longitudinally of the structure in parallel relation with respect to the other set of said shuffle members to provide a valley-to-valley progressing action for rows of articles supported by the shuffle feed structure, each of said shuffle members having an article supporting surface and an article advancing face, at least one shuffle member of each set having a series of alike pockets of the same generally symmetrical shape formed in the article advancing face thereof to advance articles in files, and said pocket containing members being adjacent each other and having their pockets offset with respect to each other transversely of said sorting structure, whereby, when a pair of articles in side by side relation in a pocket of one of said pocket containing shuffle members is dropped onto an adjacent pocket of the adjacent pocket containing shuffle member, one of the pair falls into the pocket and the other is prevented from falling by the interfering offset surface of the lower pocket, and the advancing force of said adjacent pocket is applied to the other article in said pocket to advance one of said two articles with respect to the other.

2. A shuffle feed sorting structure as recited in claim 1, in which the corner surface formed by an article advancing face of a pocket and the adjacent article supporting face of the shuffle member having the pocket is of cutaway construction, whereby the lower only of two articles in superposed relation will receive the advancing force.

3. A shuffle feed sorting structure as recited in claim 1, in which each pocket containing shuffle member comprises a base structure and a detachably mounted pocket containing portion.

4. A shuffle feed sorting structure comprising a frame, a first set of transversely disposed shuffle members carried by said frame, a second set of transversely disposed shuffle member carried by said frame and interposed between the shuffle members of said first set in alternating relation therewith, means mounting at least one set of said shuffle members for reciprocation longitudinally of the structure in parallel relation with respect to the other set of said shuffle members to provide a valley-to-valley progressing action for rows of articles supported by the shuffle feed structure, each of said shuffle members having an article supporting surface and an article advancing face, at least one shuffle member of each set having a series of pockets formed in the article advancing face thereof, the corner surface formed by an article advancing face of a pocket and the adjacent article supporting face of the shuffle member having the pocket is of cutaway construction, whereby the lower of two articles in superposed relation will receive the advancing force of the pocket.

5. A shuffle feed sorting structure as recited in claim 4 in which the cutaway construction is a beveled surface.

References Cited

UNITED STATES PATENTS

| | | | |
|---|---|---|---|
| 1,760,369 | 5/1930 | Moe | 198—218 |
| 2,787,361 | 4/1957 | Harvey et al. | 198—219 X |
| 3,291,173 | 12/1966 | Smith et al. | 198—219 X |
| 2,792,929 | 5/1957 | Magnuson | 198—218 |

ANDRES H. NIELSEN, Primary Examiner